(12) United States Patent
Wu

(10) Patent No.: US 9,140,855 B2
(45) Date of Patent: Sep. 22, 2015

(54) WAVEGUIDE STRUCTURE BASED ON LOW FREQUENCY SURFACE PLASMON POLARITONS

(71) Applicant: CHUNG HUA UNIVERSITY, Hsinchu (TW)

(72) Inventor: Chia Ho Wu, Tainan (TW)

(73) Assignee: Chung Hua University, Hsinchu (TW)

( * ) Notice: Subject to any disclaimer, the term of this patent is extended or adjusted under 35 U.S.C. 154(b) by 97 days.

(21) Appl. No.: 14/143,035

(22) Filed: Dec. 30, 2013

(65) Prior Publication Data
US 2015/0185417 A1 Jul. 2, 2015

(51) Int. Cl.
*H04W 4/00* (2009.01)
*G02B 6/122* (2006.01)

(52) U.S. Cl.
CPC .................... *G02B 6/1226* (2013.01)

(58) Field of Classification Search
CPC ...................................... H04W 4/00
USPC ................. 370/328–338, 276, 282
See application file for complete search history.

(56) References Cited

U.S. PATENT DOCUMENTS

| 6,801,691 B2 * | 10/2004 | Berini | 385/39 |
| 7,583,882 B2 * | 9/2009 | Guo | 385/131 |
| 8,358,880 B2 * | 1/2013 | Liu et al. | 385/2 |
| 8,472,771 B2 * | 6/2013 | Karalis et al. | 385/129 |

* cited by examiner

*Primary Examiner* — Michael T Vu
(74) *Attorney, Agent, or Firm* — Rosenberg, Klein & Lee

(57) ABSTRACT

A structure of a low frequency surface plasmon polariton waveguide includes multiple unit cell blocks arranged at a sub-wavelength period to line up in a one-dimensional line-up direction to form a hollow metallic block periodic structure. Each unit cell blocs includes a body, a penetration section, and an open slot. The penetration section is formed in the unit cell block by extending in a direction perpendicular to the one-dimensional line-up direction so as to define a channel space in the unit cell block. In a low frequency spoof surface plasmon polariton transmission mode, in case of serving as a structure of an antenna, each unit cell block has an electromagnetic field distribution mostly confined in a channel space of the unit cell block; and in case of serving as a waveguide, the electromagnetic field is mostly distributed between two adjacent unit cell blocks with minority distributed in the channel space.

14 Claims, 7 Drawing Sheets

WAVEGUIDE STRUCTURE BASED ON LOW FREQUENCY SURFACE PLASMON POLARITONS

BACKGROUND OF THE INVENTION

1. Field of the Invention

The present invention relates to a structure of a low frequency surface plasmon polariton (SPP) waveguide, and in particular to a novel leakage waveguide composed of a unique metallic hollow block periodic structure surface that enables the metal surface to transmit electromagnetic waves in a more efficient manner and may serve as a highly directional radiation element.

2. The Related Arts

Using the general idea of surface plasmon polariton to manipulate electromagnetic waves in order to make transmission along a sub-wavelength path possible is an important contemporary issue for effectively enhancing device density of a photo circuit system and an integrated circuit. Surface plasmon polaritons (SPPs) are a hybridized excitation state of electron and photon occurring at interface between a metal and a medium (usually air). SPPs have a field amplitude that is maximum at the interface and exponentially attenuates in the metal and the medium. SPPs provides a possibility of guiding electromagnetic beyond diffraction limit and thus attract wide interesting in the surface plasmon polariton photonics.

Due to the electromagnetic field being highly confined around the interface between the metal and the medium, SPPs has an inherent two-dimensional (that is surface) transmission property that makes it a priority candidate for high integration of integrated optical circuit and design of photon device in the range of subwavelength. It is thus urgently desired to transmit signals in a circuit system of a relatively low frequency and to promote the application of the idea of SPPs to frequency bands of even lower frequencies, such as terahertz bands and microwave bands, for transmission of signals In general, metals have a SPPs frequency that is in the ultraviolet band so that the behavior of the metals in the terahertz band is close to perfect electric conductor (PEC). This makes SPPs poor in confinement of electromagnetic field on the metal surface, incapable of effectively concentrating electromagnetic wave, thereby limiting the application of a leakage antenna of a regular structure in the terahertz band and the microwave band.

However, since the SPPs mode is generally impossible to realize in a low frequency, such as the microwave and terahertz bands, to achieve a similar physical phenomenon in a low frequency band, periodic metallic blocks or periodic grooves in a high density arrangement may be formed on the metal to realize high confinement of electromagnetic field. In a waveguide structure used in the prior art, a plurality of unit cell blocks that is spaced from each other by a fixed distance is arranged on a top surface of a planar metal substrate. In such a periodic structure of solid metallic blocks, the distribution of an electromagnetic field is highly confined in-between two adjacent unit cell blocks.

SUMMARY OF THE INVENTION

To overcome such a problem, a unique design of structure that can be employed to improve the behavior of a metal in confining an electromagnetic field would be of high value for industrial use.

Thus, an object of the present invention is to provide a low frequency surface plasmon polariton waveguide, which comprises a plurality of unit cell blocks arranged at a subwavelength period (with interval between the unit cell blocks being less than the wavelength of the transmission wave) on a top surface of a metal substrate to line up in one-dimensional line-up direction to form a hollow metallic block periodic structure. Each of the unit cell blocks comprises a channel space formed therein. A low frequency spoof surface plasmon polariton transmission mode is introduced in a forbidden band regime of the hollow metallic block periodic structure. Under the low frequency spoof surface plasmon polariton transmission mode, each of the unit cell blocks has an electromagnetic field distribution that is mostly confined in a channel space of each of the unit cell blocks.

In a preferred embodiment, each of the unit cell blocks comprises a body, a penetration section, and a open slot. The penetration section is formed in the unit cell block by extending in the one-dimensional line-up direction so as to define the channel space in the unit cell block. Under the low frequency spoof surface plasmon polariton transmission mode, in case of serving as a structure of an antenna, each of the unit cell blocks has an electromagnetic field distribution that is mostly confined in the channel space of the unit cell block; and in case of serving as a waveguide, the electromagnetic field is mostly distributed between two adjacent ones of the unit cell blocks with minority distributed in the channel space.

In a preferred embodiment, the metal substrate is made of a metal having excellent electrical conductivity (such as one of aluminum, copper) and the hollow metallic block periodic structure has a working frequency in one of a microwave band and a terahertz band.

In a preferred embodiment, the open slot has a narrow open slot bottom width and a wide open slot top width. A chamfer having an inclined chamfer angle is formed between upper and lower surfaces of the open slot. As such, a large spacing width is formed between the upper surfaces of the left top section and the right top section, while a small spacing width is formed between the lower surfaces thereof.

Further, a first chamfer section is formed at an intersection between inside surfaces of the body and the left section; a second chamfer section is formed at an intersection between inside surfaces of the body and the right section; a third chamfer section is formed at an intersection between inside surfaces of the left section and the left top section; and a fourth chamfer section is formed at an intersection between inside surfaces of the right section and the right top section. Each of the chamfer sections defines a chamfer angle.

For the efficacy, comparison of magnetic field distribution between the prior-art solid metallic block periodic structure and the hollow metallic block periodic structure according to the present invention indicates that in the transmission mode of the hollow metallic block periodic structure of the present invention, the electromagnet field distribution for the low frequency spoof surface plasmon polariton mode is mostly concentrated in the interior of the channel space of the unit cell block and between two unit cell blocks so that higher confinement of the electromagnetic field can be realized and an improved transmission effect is provided, as compared to the solid metallic block periodic structure array waveguide.

The design of the present invention enables achievement of high confinement of electromagnetic field and provides a scanning element that change the direction of a main wave beam with frequency so that in an operation, corresponding size and structure can be selected and frequency used can be adjusted.

This structure possesses advantageous characteristics that are not owned by numerous low frequency surface plasmon waveguide. Through proper section of geometric parameters of the structure, it is possible to provide a function of high confinement wave guiding in a designated range of frequency. On the other hand, the structure may also provide a scanning element that changes the direction of the main wave beam with frequency.

In an application of the present invention, the structure of wave guide can be reduced to certain extents and can be used for transmission of guided wave in a terahertz band to provide more effective confinement of electromagnetic fields. Besides, adjustment of geometric parameters of the structure allows the waveguide itself to provide directed radiation of narrow beam.

Further, the open slot and the channel space of each of the unit cell blocks are provided with chamfered structure, making it easier to control the distribution of electromagnetic field.

BRIEF DESCRIPTION OF THE DRAWINGS

The present invention will be apparent to those skilled in the art by reading the following description of preferred embodiments of the present invention, with reference to the attached drawings, in which.

DETAILED DESCRIPTION OF THE PREFERRED EMBODIMENTS

Figure 1:
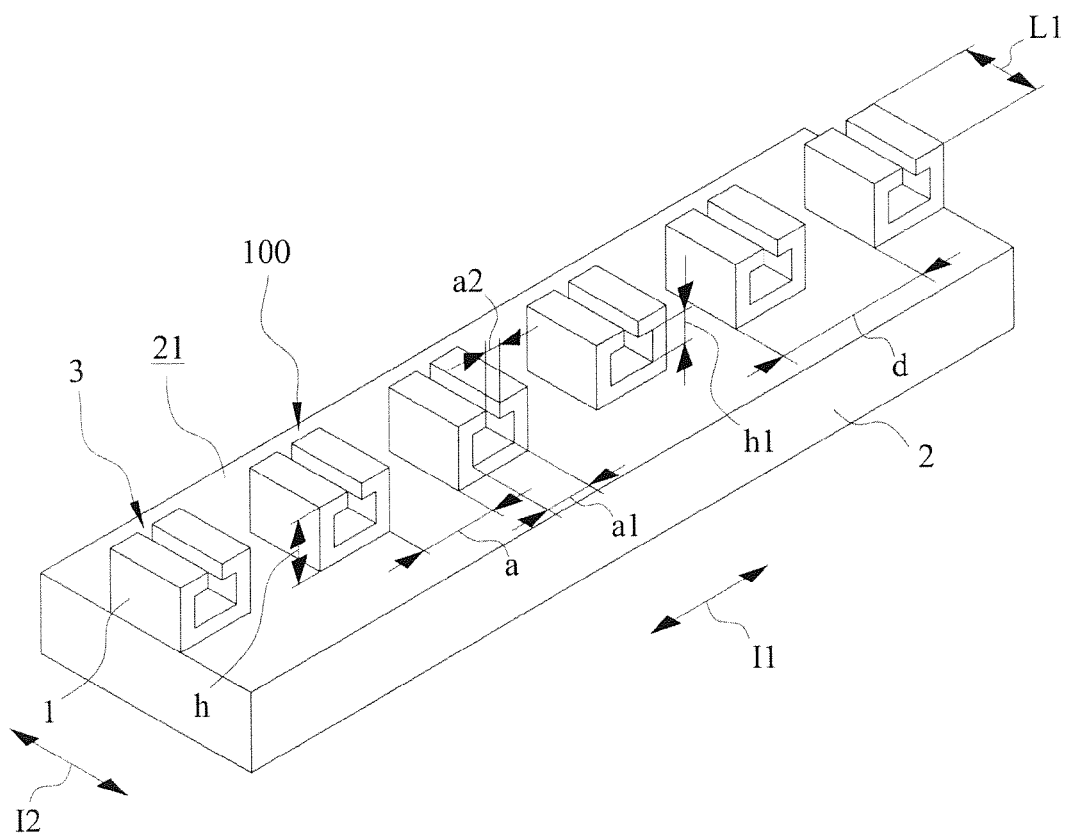
FIG. 1 is a perspective view showing a structure of a low frequency surface plasmon polariton waveguide according to a first embodiment of the present invention.

With reference to the drawings and in particular to FIG. 1, which is a perspective view showing a structure of a low frequency surface plasmon polariton waveguide according to a first embodiment of the present invention, the structure of the low frequency surface plasmon polariton waveguide according to the present invention comprises a plurality of unit cell blocks 1 that is spaced from each other by a predetermined interval and is arranged on a top surface 21 of a planar metal substrate 2. The unit cell blocks 1 are arranged, at a sub-wavelength period, to line up in a line along a one-dimensional line-up direction 11 on the top surface 21 of the metal substrate 2 to form a hollow metallic block periodic structure 100.

Figure 2:
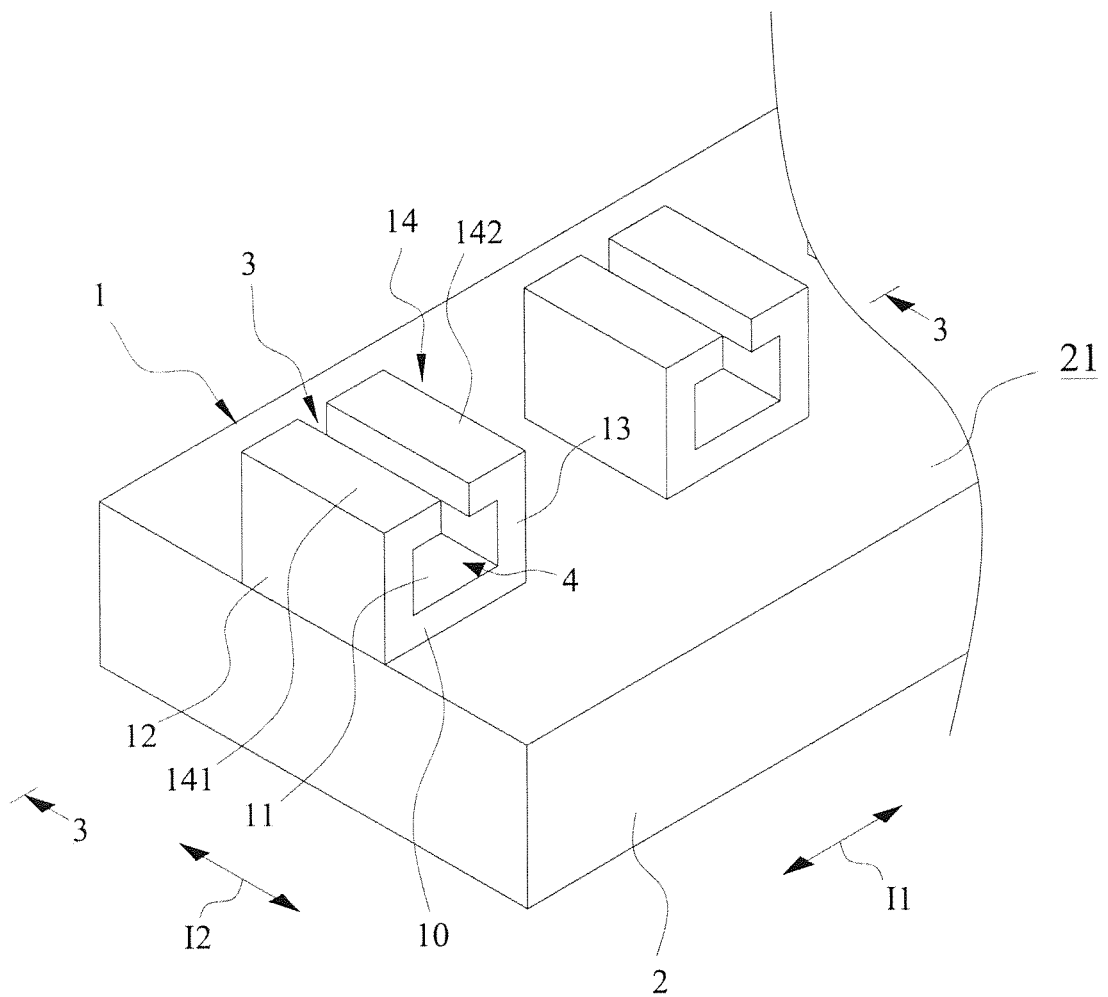
FIG. 2 is a perspective view, in an enlarged form, showing a unit cell block according to the first embodiment of the present invention.
Figure 3:
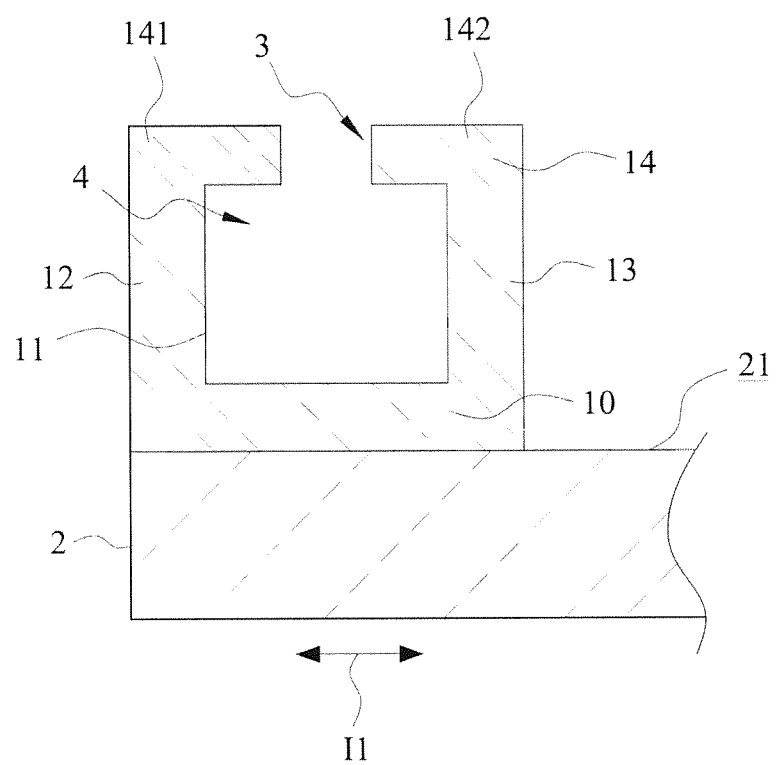
FIG. 3 is a cross-sectional view taken along line 3-3 of FIG. 2.

Referring to FIGS. 2-3, which are respectively a perspective view, in an enlarged form, and a cross-sectional view showing the unit cell block 1 according to an embodiment of the first embodiment of the present invention, the unit cell block 1 comprises a body 10 through which a penetration section 11 is formed. The penetration section 11 extends in a horizontal penetration direction 12 that is perpendicular to the one-dimensional line-up direction 11 through the unit cell block 1, so that the unit cell block 1 forms a left section 12, a right section 13 opposite to the left section 12, and a horizontal top section 14 between the left section 12 and the right section 13. The penetration section 11 defines, in the unit cell block 1, a channel space 4 that is delimited by the left section 12, the right section 13, and the horizontal top section 14 so as to form the hollow metallic block periodic structure 100 of the present invention.

Further, an open slot 3 is formed in the horizontal top section 14 by extending in the horizontal penetration direction 12 so as to divide the horizontal top section 14 into a left top section 141 and an opposite right top section 142.

In the drawings, geometric parameters of a solid metallic block periodic structure are respectively defined as follows:
unit cell block interval (a)=5 mm
periodic length of unit cell block (d)=10 mm
unit cell block height (h)=4 mm
unit cell block length (L)=5 mm For the hollow metallic block periodic structure according to the present invention, which comprises a hollow channel space, a channel space that has the following dimensions is additionally formed in the previously described solid metallic block structure:
channel width (a1)=3.0 mm
open slot width (a2)=1.0 mm
channel depth (h1)=2.0 mm With the channel space 4 and the open slot 3 formed in each of the unit cell blocks 1, a low frequency spoof surface plasmon polariton transmission mode is introduced in a forbidden band regime of the hollow metallic block periodic structure 100. In the low frequency spoof surface plasmon polariton transmission mode, if the present invention is used as a structure of an antenna, the electromagnetic field of each of the unit cell blocks is almost confined in the channel space of the unit cell block; and in case of being used as a waveguide, most of the electromagnetic field is confined between two adjacent unit cell blocks with minority distributed in the channel space of the unit cell block.

In a preferred embodiment, the metal substrate 2 is made of a metal having excellent electrical conductivity (such as one of aluminum, copper, and gold). The working frequency band of the hollow metallic block periodic structure 100 is set in the microwave band or the terahertz (THz) band.

Figure 4:
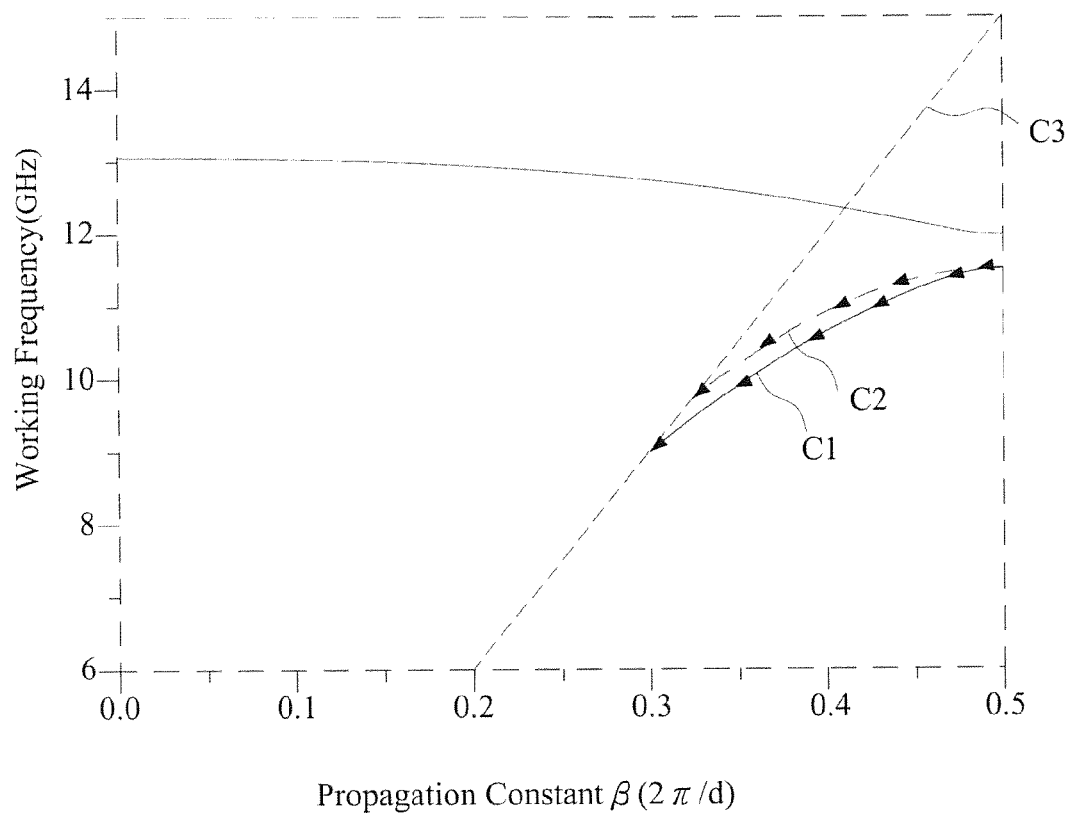
FIG. 4 is a plot showing dispersion relationships between working frequency and propagation constant for a low frequency SPP waveguide structure having hollow grooved spaces according to the first embodiment of the present invention and a solid low frequency SPP waveguide structure.

Referring to FIG. 4, which shows plots of dispersion relationships between the working frequency and the propagation constant for a hollow metallic block periodic structure according to the present invention and a known solid metallic block periodic structure, in the plot, ordinate is working frequency and abscissa is propagation constant $\rho$. In the drawing, a hollow structure dispersion curve C1 represents a dispersion curve of the hollow metallic block periodic structure of the present invention; and the solid structure dispersion curve C2 indicates the dispersion curve of the known solid metallic block periodic structure.

Numeric simulations and experiment results are generally concentrated on a fundamental mode of a waveguide structure. Such a mode can be easily excited in the X band of microwave and electromagnetic fields can be highly confined in the periodic structure of a metal waveguide. Numeric results reveal that for a surface plasmon polariton waveguide having a solid metallic block periodic structure, the cut off frequency of the fundamental mode is 9.72 GHz; the asymptotic frequency is 11.506 GHz; and the bandwidth of the working frequency is 1.786 GHz. For a working frequency of the solid metallic block periodic structure within such a range, electromagnetic fields can be highly confined between two adjacent unit cell blocks.

For the hollow metallic block array structure, the cut off frequency is 9.0 GHz; the asymptotic frequency is 11.504 GHz; and the bandwidth of the working frequency 2.504 GHz. For such a frequency range, the electromagnetic field distribution of the hollow metallic block periodic structure makes most of the energy located in the hollowed section of the hollow metallic block with only a minor amount located outside the hollowed section so that it is possible to effectively confine the electromagnetic field under a sub-wavelength size for a wider range of frequency.

For the hollow metallic block periodic structure, since each of the unit cell blocks is made hollow, an additional transmission mode will be introduced in the forbidden band regime of the solid metallic block periodic structure. In the dispersion curve of the hollow metallic block periodical structure, the electromagnetic fields at $\beta=0.5$ (frequency 11.504 GHz) of the bottom of the forbidden band are almost confined between two adjacent unit cell blocks. Due to the field distribution being extremely different, a new forbidden band structure exists. The forbidden band that is additionally introduced by the hollow metallic block has a bandwidth of 0.451 GHz. The frequency range of the leaky wave is from 12.3279 GHz to 13.068 GHz and the scanning frequency bandwidth is 0.7401 GHz.

By forming holes that are distributed at a sub-wavelength period (size and depth of the holes being less than wavelength), the transmission of electromagnetic wave is enhanced and high confinement of electromagnetic field in the sub-wavelength can be realized, very similar to the true surface plasmon polaritons and providing great operation flexibility for practical applications of spoof SPPs (SSPPs), wherein the equivalent surface plasmon frequency of the surface layer of the structure is only related to the geometric parameters of the surface structure. Thus, an effective way of propagation of waves in the terahertz band or the microwave band that is of even lower frequency on a metal surface is provided. The existence of SSPPs in the microwave band and the terahertz band has been empirically proven.

Further researches indicate that forming a one-dimensional arrangement of notches in a metal surface or a metal wire enables supporting of SSPPs transmission in the terahertz band. Further, the dispersion relationship of SSPPs can be manipulated and controlled as desired by changing the periodic structure of the notches formed in the metal surface and the properties thereof concerning field confinement and loss are only reliant on the geometric parameters of the periodic surface structure. Since the wave guiding property of a low frequency spoof surface plasmon polariton waveguide is determined by the geometric structure of the waveguide itself, increased advantages can be provided for the design of waveguide components. Thus, a number of low frequency spoof surface plasmon polariton based transmission mechanisms have been proposed by researchers, and a periodic array of metal blocks can be particularly easily realized in low frequency band. The structure of each of the unit cell blocks comprises a channel formed therein and such metallic period structures can all support surface wave.

In the present invention, each of the unit cell blocks of the periodic arrangement is provided with a channel in order to bring an additional transmission mode into the band gap of a non-channeled metallic block periodic structure. The new transmission mode concentrates most of the electromagnetic fields in the interior of the channel of the unit cell block. Further, the dispersion curve of this mode intersects the free-air dispersion curve C3 (Light line) and enters the radiation zone of the periodic structure. Experimental results verify that the metallic periodic structure provides, in the frequency band, a pencil-like wave beam that scans with frequency and the scanning angle exceeds 30 degrees.

This structure possesses advantageous characteristics that are not owned by numerous low frequency surface plasmon waveguide. Through proper section of geometric parameters of the structure, it is possible to provide a function of high confinement wave guiding in a designated range of frequency. On the other hand, the structure may also provide a scanning element that changes the direction of the main wave beam with frequency.

Leaky wave radiation presented by the structure of the present invention shows high directivity and the main wave beam always presents an elevation angle with respect to the Z-axis. According to theoretical analysis, a wave beam having significant directivity can be from an angle of 304° at 12.5 GHz to an angle of 336° at 12.9 GHz, and a scanning range of elevation angle of 32° can be obtained.

Comparison of magnetic field distribution between the known solid metallic block periodic structure and the hollow metallic block periodic structure according to the present invention indicates that in the transmission mode of the hollow metallic block periodic structure of the present invention, the electromagnet field distribution for the low frequency spoof surface plasmon polariton mode is mostly concentrated in the interior of the channel space of the unit cell block so that high confinement of the electromagnetic field can be realized and an improved transmission effect is provided, as compared to the solid metallic block periodic structure array waveguide.

Figure 5:
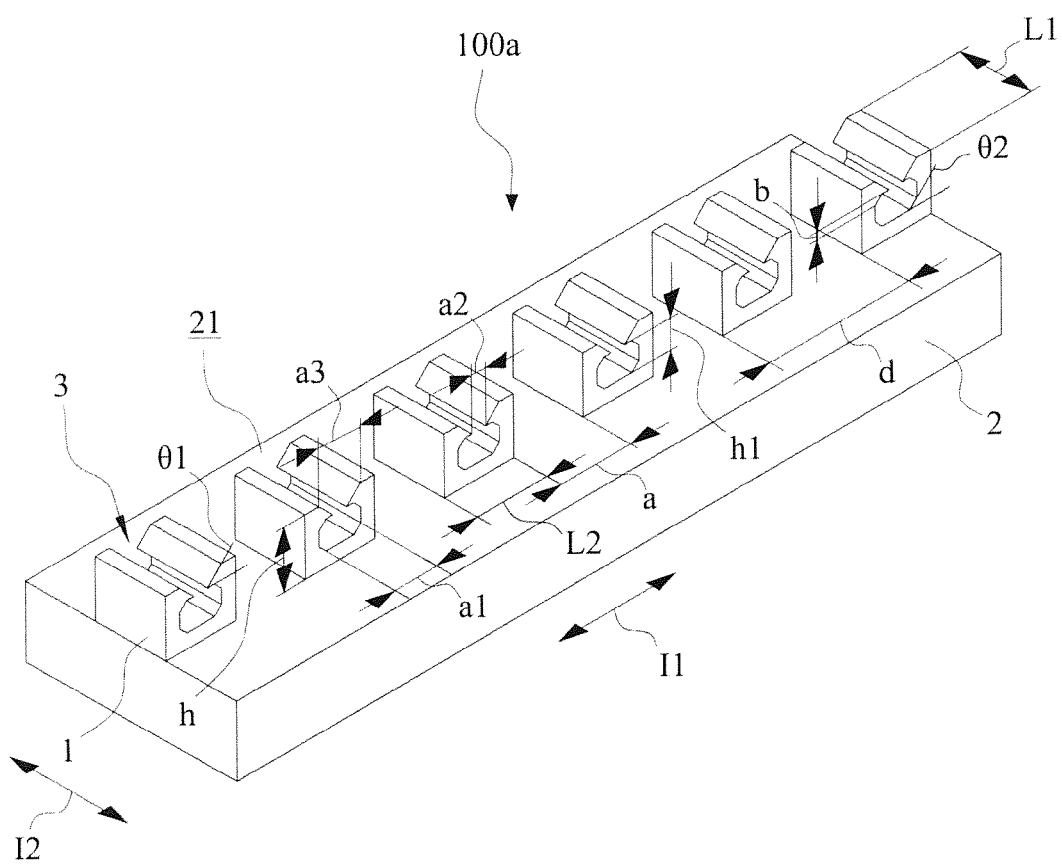
FIG. 5 is a perspective vie showing a structure of a low frequency surface plasmon polariton waveguide according to a second embodiment of the present invention.
Figure 6:
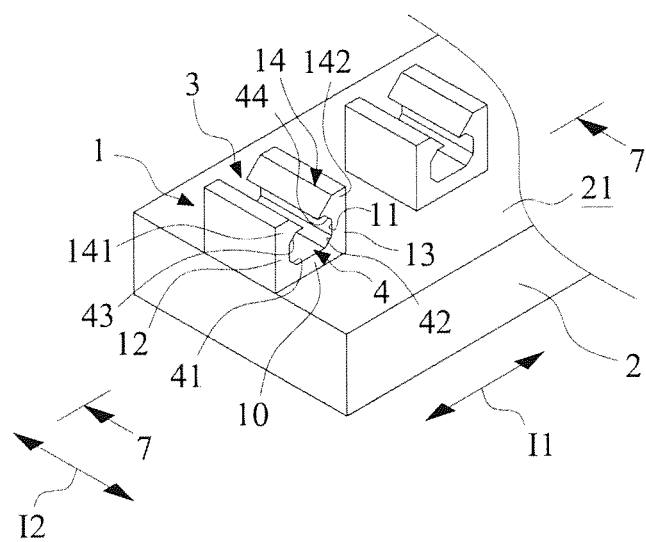
FIG. 6 is a perspective view, in an enlarged form, showing a unit cell block according to the second embodiment of the present invention.
Figure 7:
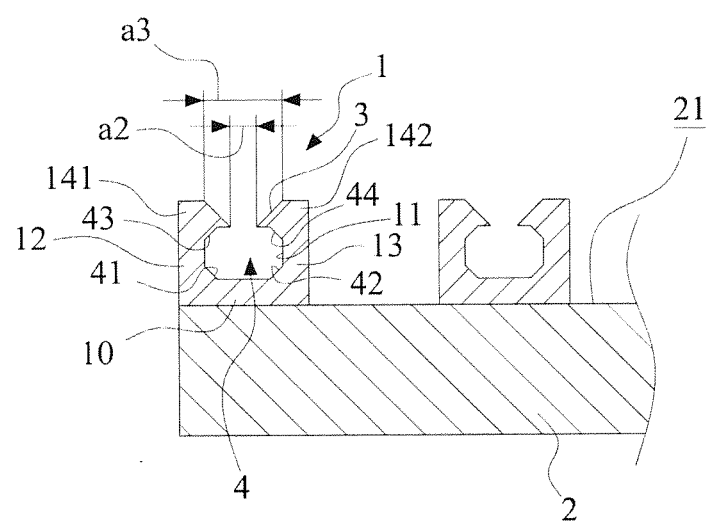
FIG. 7 is a cross-sectional view taken along line 7-7 of FIG. 6.

Referring to FIG. 5, which is a perspective view showing a structure of a low frequency surface plasma polariton waveguide according to a second embodiment of the present invention; FIG. 6, which is a perspective view, in an enlarged formed, showing a unit cell block according to the second embodiment of the present invention; and FIG. 7, which is a cross-sectional view taken along line 7-7 of FIG. 6, the second embodiment of the present invention is structured similar to the first embodiment and thus similar parts/components are designated with same references for consistency.

As shown in the drawings, in the hollow metallic block periodic structure 100a of the instant embodiment, the open slot 3 has a narrow bottom opening and a wide top opening respectively defining an open slot width a2 and an open slot top width a3. Further, a chamfer is defined by an inclined surface extending between upper and lower surfaces of the open slot 3 at an inclined chamfer angle of θ1=45 degrees. With such an arrangement, an expanded spacing distance is provided between upper surfaces of the left top section 141 and the right top section 142, while the spacing distance between the lower surfaces thereof is relatively small.

Further, in the unit cell block of the preferred embodiment of the present invention, a first chamfer section 41 is formed at the intersection between the inside surfaces of the body 10 and the left section 12; a second chamfer section 42 is formed at the intersection between the inside surfaces of the body 10 and the right section 13; a third chamfer section 43 is formed at the intersection between the inside surfaces of the left section 12 and the left top section 141; and a fourth chamfer section 44 is formed at the intersection between the inside surfaces of the right section 13 and the right top section 142. Each of the chamfer sections 41-44 has a chamfer angle of θ2=45 degrees.

In the drawings, geometric parameters of a solid metallic block periodic structure are respectively defined as follows:
unit cell block interval (a)=5 mm;
periodic length of unit cell block (d)=10 mm;
unit cell block height (h)=4 mm;
unit cell block length (L1)=5 mm; and
unit cell block width (L2)=5 mm.

The hollow metallic block periodic structure according to the present invention further includes a channel space formed in the previously described solid metallic block structure and having the following dimensions:
channel width (a1)=3.0 mm;
open slot width (a2)=1.0 mm;
open slot top width (a3)=3.0 mm;
chamfer angle (θ1) between upper and lower surfaces of the open slot=45 degrees; open slot chamfer length (b)=0.5 mm; chamfer angle (θ2) of chamfer sections (41-44)=45 degrees; and channel depth (h1)=2.0 mm.

Figure 8:
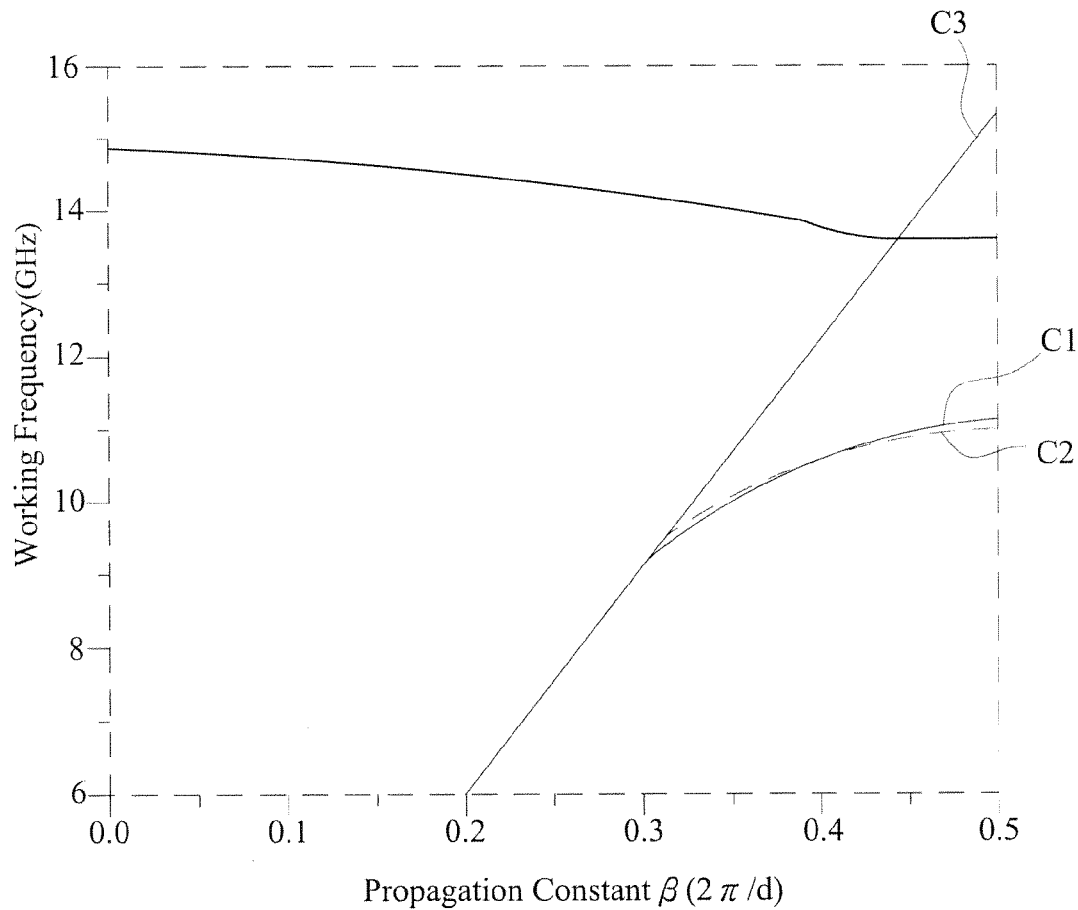
FIG. 8 is a plot showing dispersion relationships between working frequency and propagation constant for a low frequency SPP waveguide structure having hollow grooved spaces according to the second embodiment of the present invention and a solid low frequency SPP waveguide structure.

Referring to FIG. 8, which shows plots of dispersion relationships between the working frequency and the propagation constant for a low frequency surface plasmon polariton waveguide device having hollow channel spaces according to the present invention and a known solid low frequency surface plasmon polariton waveguide device, in the plot, ordinate is working frequency and abscissa is propagation constant $\beta$. In the drawing, a hollow structure dispersion curve C1 represents a dispersion curve of the hollow metallic block periodic structure of the present invention; and the solid structure dispersion curve C2 indicates the dispersion curve of the known solid metallic block periodic structure.

Numeric simulations and experiment results are generally concentrated on a fundamental mode of a waveguide structure. Such a mode can be easily excited in the X band of microwave and electromagnetic fields can be highly confined in the periodic structure of a metal waveguide. Numeric results reveal that for a surface plasmon polariton waveguide having a solid metallic block periodic structure, the cut off frequency of the fundamental mode is 9.719 GHz; the asymptotic frequency is 11.506 GHz; and the bandwidth of the working frequency is 1.7861 GHz. For a working frequency of the solid metallic block periodic structure within such a range, electromagnetic fields can be highly confined between two adjacent metal blocks.

For the hollow metallic block array structure, the cut off frequency is 9.314 GHz; the asymptotic frequency is 11.657 GHz; and the bandwidth of the working frequency 2.343 GHz. For such a frequency range, the electromagnetic field distribution of the hollow metallic block periodic structure makes most of the energy located in the hollowed section of the hollow metallic block with only a minor amount located outside the hollowed section so that it is possible to effectively confine the electromagnetic field under a sub-wavelength size for a wider range of frequency.

For the hollow metallic block periodic structure, since each of the metal blocks is made hollow, an additional transmission mode will be introduced in the forbidden band regime of the solid metallic block periodic structure. Computational analysis reveals that in the additional transmission mode of the dispersion curve of the hollow metallic block periodical structure, the electromagnetic fields at the propagation constant $\beta$=0.5 (frequency 11.355 GHz) are almost distributed within the channel spaces. In the dispersion curve of the hollow metallic block periodical structure, for the distribution of magnetic fields at $\beta$=0.5 (frequency 11.657 GHz) of the bottom of the forbidden band, the electromagnetic fields are almost confined between two adjacent metal blocks. Due to the field distribution being extremely different, a new forbidden band structure exists. The forbidden band that is additionally introduced by the hollow metallic block has a bandwidth of 1.698 GHz. The frequency range of the leaky wave is from 13.4556 GHz to 14.8794 GHz and the scanning frequency bandwidth is 1.4238 GHz.

Leaky wave radiation presented by the structure of the present invention shows high directivity and the main wave beam always presents an elevation angle with respect to the Z-axis. According to theoretical analysis, for the field distribution of leaky wave at a frequency of 13.6623 GHz, the main wave beam is at an elevation angle of $\theta$=293°. For far field distribution of leaky wave radiation at a frequency of 14.73141 GHz, the main wave beam has an elevation angle of $\theta$=342°. Thus, if a fed signal changes continuously from 13.6623 GHz to 14.7341 GHz, an actual wave beam will scan between the two angles and provides a scanning range of the elevation angle that is 49°.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A structure of a low frequency surface plasmon polariton waveguide, comprising:
    a metal substrate, which has atop surface;
    a hollow metallic block periodic structure, wherein the hollow metallic block periodic structure is operable in a predetermined working frequency band and defines a forbidden band regime;
    the hollow metallic block periodic structure comprising a plurality of unit cell blocks that is spaced from each other by a predetermined interval, the unit cell blocks being arranged at a sub-wavelength period in a one-dimensional line-up direction to line up on the top surface of the metal substrate, each of the unit cell blocks generating an electromagnetic field distribution in the working frequency band;
    a low frequency spoof surface plasmon polariton transmission mode being introduced in the forbidden band regime of the hollow metallic block periodic structure;
    characterized in that:
    each of the unit cell blocks comprises a channel space; and
    under the low frequency spoof surface plasmon polariton transmission mode, the hollow metallic block periodic structure provides a structure of an antenna, the electromagnetic field distribution of each of the unit cell blocks being mostly confined in a channel space of the unit cell block;
    each of the unit cell blocks comprises:
    a body;
    a penetration section, which penetrates through the body by extending in a horizontal penetration direction so as to define the channel space in the body, the channel space being delimited by a left section, a right section opposite to the left section, and a horizontal top section between the left section and the right section; and an open slot, which is formed in the horizontal top section by extending in the horizontal penetration direction so as to divide the horizontal top section into a left top section and a right top section.

2. The structure of the low frequency surface plasmon polariton waveguide as claimed in claim 1, wherein the open slot has a narrow open slot width and a wide open slot top width.

3. The structure of the low frequency surface plasmon polariton waveguide as claimed in claim 1, wherein the working frequency band of the hollow metallic block periodic structure is one of a microwave band and a terahertz band.

4. The structure of the low frequency surface plasmon polariton waveguide as claimed in claim 1, wherein each of the unit cell blocks comprises the following geometric parameters:
unit cell block interval (a)=5 mm;
periodic length of unit cell block (d)=10 mm;
unit cell block height (h)=4 mm;
unit cell block length (L1)=5 mm;
channel width (a1)=3.0 mm;
open slot width (a2)=1.0 mm; and
channel depth (h1)=2.0 mm.

5. The structure of the low frequency surface plasmon polariton waveguide as claimed in claim 1, wherein each of the unit cell blocks comprises the following geometric parameters:
unit cell block interval (a)=5 mm;
periodic length of unit cell block (d)=10 mm;
unit cell block height (h)=4 mm;
unit cell block length (L1)=5 mm;
unit cell block width (L2)=5 mm;
channel width (a1)=3.0 mm;
open slot width (a2)=1.0 mm;
open slot top width (a3)=3.0 mm;
chamfer angle ($\theta$1) between upper and lower surfaces of the open slot=45 degrees;
open slot chamfer length (b)=0.5 mm; and
channel depth (h1)=2.0 mm.

6. The structure of the low frequency surface plasmon polariton waveguide as claimed in claim 1, wherein a first chamfer section is formed at an intersection between inside surfaces of the body and the left section; a second chamfer section is formed at an intersection between inside surfaces of the body and the right section; a third chamfer section is formed at an intersection between inside surfaces of the left section and the left top section; and a fourth chamfer section is formed at an intersection between inside surfaces of the right section and the right top section.

7. The structure of the low frequency surface plasmon polariton waveguide as claimed in claim 6, wherein each of the first, second, third, and fourth chamfer sections has a chamfer angle of $\theta$2=45 degrees.

8. A structure of a low frequency surface plasmon polariton waveguide, comprising:
a metal substrate, which has a top surface;
a hollow metallic block periodic structure, wherein the hollow metallic block periodic structure is operable in a predetermined working frequency band and defines a forbidden band regime;
the hollow metallic block periodic structure comprising a plurality of unit cell blocks that is spaced from each other by a predetermined interval, the unit cell blocks being arranged at a sub-wavelength period in a one-dimensional line-up direction to line up on the top surface of the metal substrate, each of the unit cell blocks generating an electromagnetic field distribution in the working frequency band;
a low frequency spoof surface plasmon polariton transmission mode being introduced in the forbidden band regime of the hollow metallic block periodic structure;
characterized in that:
each of the unit cell blocks comprising a channel space; and
under the low frequency spoof surface plasmon polariton transmission mode, the hollow metallic block periodic structure providing a structure of a waveguide, the electromagnetic field distribution being mostly between two adjacent ones of the unit cell blocks with minority in a channel space of the unit cell block;
each of the unit cell blocks comprises:
a body;
a penetration section, which penetrates through the body by extending in a horizontal penetration direction so as to define the channel space in the body, the channel space being delimited by a left section, a right section opposite to the left section, and a horizontal top section between the left section and the right section; and
an open slot, which is formed in the horizontal top section by extending in the horizontal penetration direction so as to divide the horizontal top section into a left top section and a right top section.

9. The structure of the low frequency surface plasmon polariton waveguide as claimed in claim 8, wherein the open slot has a narrow open slot width and a wide open slot top width.

10. The structure of the low frequency surface plasmon polariton waveguide as claimed in claim 8, wherein the working frequency band of the hollow metallic block periodic structure is one of a microwave band and a terahertz band.

11. The structure of the low frequency surface plasmon polariton waveguide as claimed in claim 8, wherein each of the unit cell blocks comprises the following geometric parameters:
unit cell block interval (a)=5 mm;
periodic length of unit cell block (d)=10 mm;
unit cell block height (h)=4 mm;
unit cell block length (L1)=5 mm;
channel width (a1)=3.0 mm;
open slot width (a2)=1.0 mm; and
channel depth (h1)=2.0 mm.

12. The structure of the low frequency surface plasmon polariton waveguide as claimed in claim 8, wherein each of the unit cell blocks comprises the following geometric parameters:
unit cell block interval (a)=5 mm;
periodic length of unit cell block (d)=10 mm;
unit cell block height (h)=4 mm;
unit cell block length (L1)=5 mm;
unit cell block width (L2)=5 mm;
channel width (a1)=3.0 mm;
open slot width (a2)=1.0 mm;
open slot top width (a3)=3.0 mm;
chamfer angle ($\theta$1) between upper and lower surfaces of the open slot=45 degrees;
open slot chamfer length (b)=0.5 mm; and
channel depth (h1)=2.0 mm.

13. The structure of the low frequency surface plasmon polariton waveguide as claimed in claim 8, wherein a first chamfer section is formed at an intersection between inside surfaces of the body and the left section; a second chamfer section is formed at an intersection between inside surfaces of the body and the right section; a third chamfer section is formed at an intersection between inside surfaces of the left section and the left top section; and a fourth chamfer section is formed at an intersection between inside surfaces of the right section and the right top section.

14. The structure of the low frequency surface plasmon polariton waveguide as claimed in claim 13, wherein each of the first, second, third, and fourth chamfer sections has a chamfer angle of $\theta 2=45$ degrees.

* * * * *